E. GASPER.
VEHICLE WHEEL.
APPLICATION FILED JAN. 18, 1916.
1,221,721.
Patented Apr. 3, 1917.
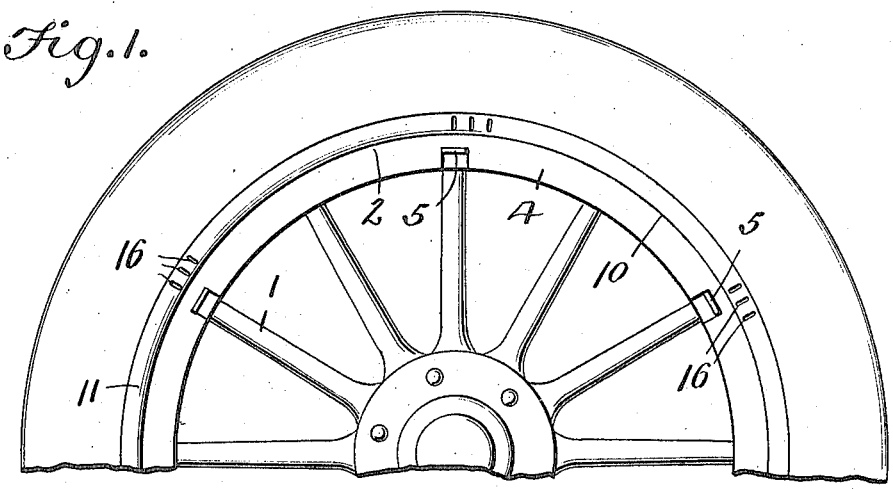
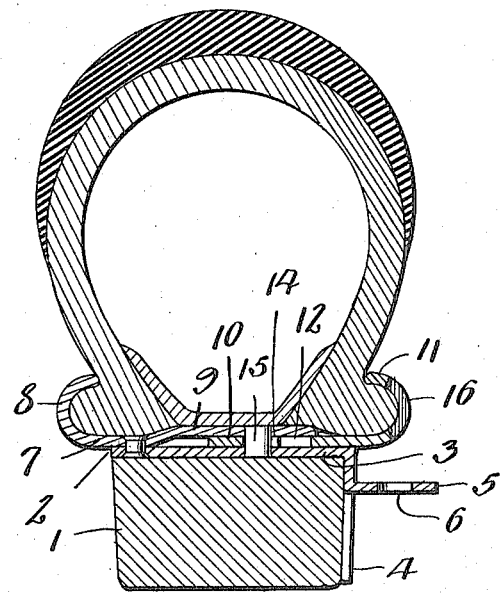
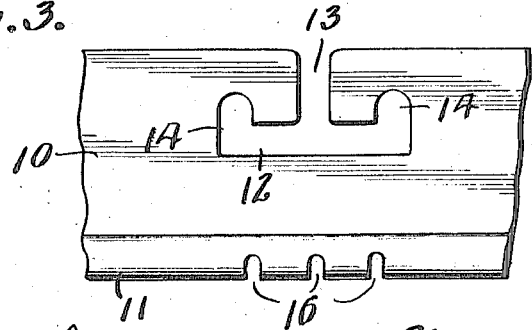
Inventor
E. Gasper,
By Victor J. Evans
Attorney
Witnesses

UNITED STATES PATENT OFFICE.

EMIL GASPER, OF GRASS VALLEY, CALIFORNIA.

VEHICLE-WHEEL.

1,221,721.  Specification of Letters Patent.  Patented Apr. 3, 1917.

Application filed January 18, 1916. Serial No. 72,809.

*To all whom it may concern:*

Be it known that I, EMIL GASPER, a citizen of the United States, residing at Grass Valley, in the county of Nevada and State of California, have invented new and useful Improvements in Vehicle-Wheels, of which the following is a specification.

This invention relates to improvements in vehicle wheels and has particular application to a divided wheel rim of the type in which one of the clencher edges of the rim can be separated from the body of the rim so as to enable the tire to be placed on the rim and removed therefrom.

In carrying out the present invention, it is my purpose to improve and simplify the general construction of divided wheel rims of the class described and to provide a rim wherein the removable clencher edge may be quickly detached from the wheel and applied thereto and secured in applied position without the use of bolts and analogous separate fastening devices.

With the above and other objects in view, the invention consists in the construction, combination and arrangement of parts hereinafter set forth in and falling within the scope of the claim.

In the accompanying drawing;

Figure 1 is a view in side elevation of a wheel equipped with a rim constructed in accordance with the present invention.

Fig. 2 is a transverse sectional view through the wheel and rim thereof.

Fig. 3 is a fragmentary plan view of the movable section showing the arrangement of the slots therein.

Referring now to the drawing in detail, 1 designates a wheel constructed of any suitable material and embodying a hub, spokes and felly. Surrounding the felly of the wheel is a rim 2 embodying a bottom annular section 3 secured to the periphery of the felly and having one side edge flanged inwardly as at 4 and stamped to form outwardly projecting lugs 5 spaced apart about the wheel equidistant and disposed at right angles to the flange, the lugs 5 being formed with openings 6 respectively. Surrounding the bottom section 3 and fixed thereto at the edge of the section remote from the flange 4 is a stationary section 7 having the outer edge flanged upwardly and inwarlly as at 8 to form a clencher edge. The inner portion of the stationary section 7, that is, the portion disposed inwardly of the connections between the stationary section and the bottom section 3, is offset outwardly as at 9 and spaced apart from the bottom section. 10 designates a movable section surrounding the bottom section 3 and having the inner portion thereof lying within the space between the bottom section and the stationary section 7 and the outer edge flanged upwardly and inwardly as at 11 to form a clencher edge. The inner portion of the movable section 10 is formed with transverse slots 12 opening onto the inner edge of such section and spaced apart suitable distances around the movable section, and with longitudinally extending slots 13 in open communication with the slots 12 respectively at the central portions thereof. The opposite ends of each longitudinal slot 13 open into cross slots 14 respectively formed in the movable section 10. Arranged within the space between the bottom section 3 and the stationary section 7 are pins 15 spaced apart distances corresponding to the spaces between the slots 12 in the movable section 10.

In practice, the movable section 10 is removed from the felly and as the tire is applied to the felly, one bead thereof engages the clencher edge of the rim formed by the flange 4, while the other bead is forced inwardly on the felly. The movable section 10 is now slipped onto the felly and the clencher edge formed by the flange 11 engages the adjacent bead of the tire, while the inner portion of such movable section slides into the space between the bottom section 3 and the stationary section 7 and the transverse slots 12 receive the pins 15 respectively. The movable section is now rotated about the felly to bring one or the other set of cross slots 14, according to the direction of rotation of the movable section, into alinement with the pins 15. When the pins 15 aline with the particular set of cross slots the movable section of the rim is released and the tire reacts and moves the movable section outwardly to engage the pins in the cross slots, thereby locking the movable section on the felly of the wheel in coöperative relation with the stationary section.

In the present instance, the flange forming the clencher edge on the movable section 10 is formed with an annular series of notches 16 suitably spaced apart and adapted to receive a tool, the tool being passed through the opening in one of the lugs 5 and engaged in an adjacent notch 16 and swung about the lug as a fulcrum to rotate the movable section relatively to the stationary section to facilitate the application of the tire to the felly and the removal of such tire therefrom.

I claim:

In a wheel, the combination with the hub, spokes and felly, of a rim surrounding the said felly and comprising a bottom annular section secured to the felly and having one side edge flanged inwardly and stamped to form outwardly projecting lugs spaced apart equal distances around the wheel and arranged at right angles to the flange and formed with openings, respectively, a divided rim surrounding the first mentioned rim and comprising a stationary section secured to the first mentioned rim and having the outer edge projecting beyond the felly and flanged upwardly and inwardly to form a clencher edge, and the inner edge portion offset outwardly from said first rim and spaced apart therefrom, and a movable section surrounding the rim portion of the first mentioned rim and removable therefrom and having the inner edge disposed within the space between the first named rim and the inner edge of the first named section and the outer edge flanged upwardly and inwardly to form a clencher edge, pins within the space between said first mentioned rim and the offset inner edge of the said first named section and spaced apart about the felly, the inner edge portion of said movable section being formed with transverse slots opening onto the inner edge of said section and longitudinal slots contiguous to the inner ends of said transverse slots respectively, said slots being adapted to receive said pins to lock the sections of said divisional rim in rim formation, the clencher edge of the second named section being formed with notches contiguous to said lugs respectively to accommodate a tool passed through the opening in a lug.

In testimony whereof I affix my signature in presence of two witnesses.

EMIL GASPER.

Witnesses:
I. T. LEATHAM,
CHAS. CASSONY.

Copies of this patent may be obtained for five cents each, by addressing the "Commissioner of Patents, Washington, D. C."